United States Patent [19]

Ebenstein

[11] Patent Number: 5,651,293

[45] Date of Patent: Jul. 29, 1997

[54] SHIFTER WITH NOVEL LEVER PIVOTING MEANS AND METHOD OF ASSEMBLING

[75] Inventor: Scott M. Ebenstein, Rockford, Mich.

[73] Assignee: Grand Haven Stamped Products, Grand Haven, Mich.

[21] Appl. No.: 419,904

[22] Filed: Apr. 11, 1995

[51] Int. Cl.[6] .............. F16H 59/04; B60K 20/04
[52] U.S. Cl. .............. 74/475; 74/473 R; 74/538; 384/276
[58] Field of Search ............ 74/475, 538, 473 P, 74/473 R, 491, 523; 384/276, 286, 295, 434

[56] References Cited

U.S. PATENT DOCUMENTS

| 2,616,305 | 11/1952 | Rossire | 74/491 |
|---|---|---|---|
| 2,905,511 | 9/1959 | Cerness | 384/295 |
| 4,324,149 | 4/1982 | Johansson et al. | 74/473 R |
| 4,558,960 | 12/1985 | Lehtinen et al. | 384/286 X |
| 4,758,202 | 7/1988 | Maciag et al. | 384/276 X |
| 5,187,998 | 2/1993 | Asano et al. | 74/523 |
| 5,261,749 | 11/1993 | Bennett et al. | 384/276 |
| 5,309,783 | 5/1994 | Doolittle et al. | 74/473 P |
| 5,442,975 | 8/1995 | Osborn | 74/473 R |
| 5,445,046 | 8/1995 | Kataumi et al. | 74/475 X |

FOREIGN PATENT DOCUMENTS

| 558282 | 9/1993 | European Pat. Off. | 384/276 |
|---|---|---|---|
| 430195 | 6/1927 | Germany | 74/473 R |

*Primary Examiner*—Charles A. Marmor
*Assistant Examiner*—Troy Grabow
*Attorney, Agent, or Firm*—Price, Heneveld, Cooper, DeWitt & Litton

[57] ABSTRACT

A transmission shifter having a unique structure for pivoting its lever assembly and a novel structure and method for assembling the parts. The structure for pivoting the lever assembly includes caps mounted on the ends of axles extending from the lever assembly. The apparatus and method for assembling the parts includes sockets mounted on a base and on a detent housing, which sockets capture trunnions extending from the lever assembly. Preferably such trunnions are the cap and axle combinations.

8 Claims, 3 Drawing Sheets

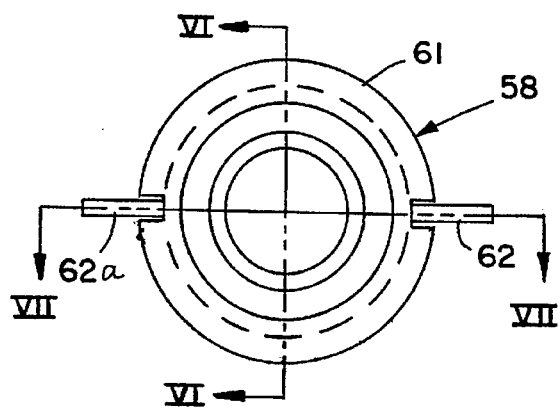
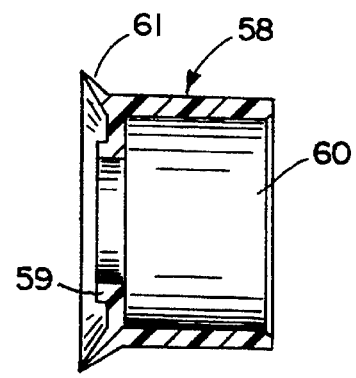
FIG. 5          FIG. 6
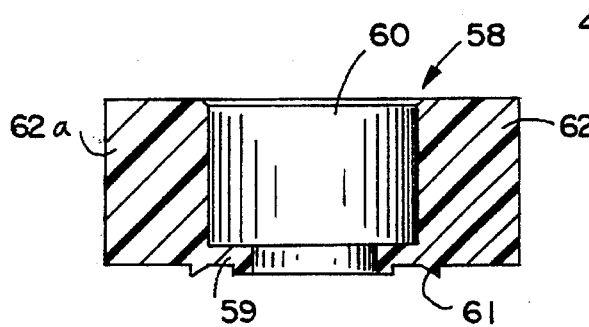
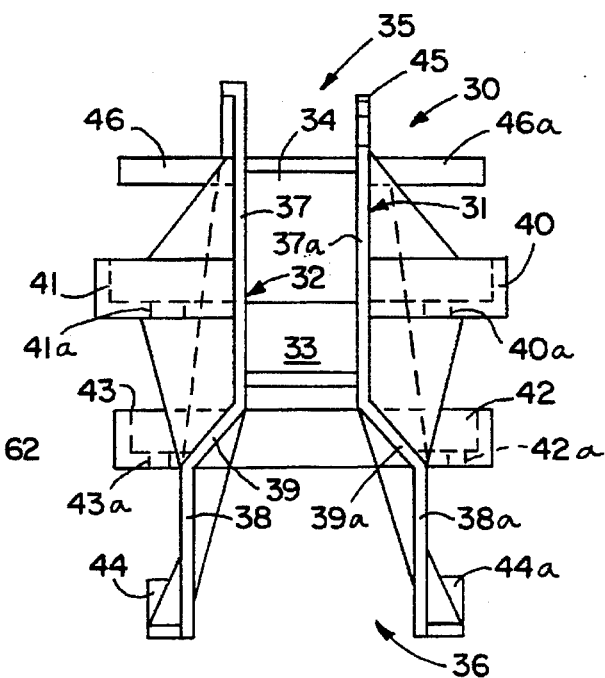
FIG. 7          FIG. 8

SHIFTER WITH NOVEL LEVER PIVOTING MEANS AND METHOD OF ASSEMBLING

This invention relates generally to a shifter mechanism having a pivotable lever assembly and a novel means for pivoting such lever assembly and including the method of assembling the shifter.

BACKGROUND OF THE INVENTION

Present-day shifter mechanisms for vehicles are constructed in a number of different ways but substantially all of them include a base, a structure for pivoting a lever assembly on such base, and a detent plate having detent notches in which the pawl of the shifter lever assembly is located. The position of the pawl within various notches of the detent plate determines the mode of the transmission being controlled by the shifter. The types and structures of such shifters are too numerous to describe. Suffice it to say that efforts have been made to simplify the construction and assembly of such shifters in order to reduce the cost in both the parts and in the assembly methods so as to reduce the labor required both in the fabrication and in the assembly of the various parts of the shifter.

Another problem in vehicle shifters resides in the means for pivoting the lever assembly so as to provide the optimum less effort in pivoting the lever assembly fore and aft of the vehicle while at the same time minimizing any looseness in the side-wise motion of the lever assembly. Attempts have been made to eliminate or to minimize this side looseness, but such attempts have resulted in adversely affecting the forward effort required to shift. Also, efforts have been made to minimize the forward effort in shifting by eliminating the side-wise friction on the shifter assembly, but this has resulted in side looseness. Therefore, there has existed for some time a need for a structure which divorces the side looseness from the forward shifting effort.

The object of the present invention is to provide a simplified, low-cost version of a vehicle shifting mechanism by reducing the number of parts. Further, another object of this invention is to not only provide a simplified, lower cost version of a vehicle shifter, but one which provides for an improved pivoting means for the lever assembly which is easier to assemble and which divorces the side-wise looseness of the lever assembly from the forward shifting effort.

SUMMARY OF THE INVENTION

The above objects are achieved by providing a transmission shifter in which there are three major parts including a molded base, a molded detent housing, and a lever assembly. The base has a pair of spaced first socket parts facing or depressed downwardly for receiving a trunnion. The detent housing also has a pair of spaced second socket parts facing or depressed upwardly for receiving a trunnion. The lever assembly includes a lever with a pair of spaced trunnions at the lower end thereof which are located on a common axis and means is provided for attaching the base and detent housing together with the trunnions captured between the first and second socket parts whereby the lever is pivotable about the axis of the trunnions. This structure is a simplified structure accomplishing the object of providing low-cost parts which can be easily assembled, thus providing a simplified, lower cost version of a shifter mechanism.

The other object of this invention is achieved by providing a shifter in which the lever assembly includes a pair of spaced axles at the lower end thereof, said axles being located on a common axis. Caps are provided fitted over the axles of the lever assembly. Within the broad aspect of this invention, the caps are mounted on opposite walls of a housing and axles are fitted into the caps and rotatable within the caps, the caps having sufficient width so as to minimize the side-wise looseness or movement of the axles but at the same time providing a minimal amount of friction in the forward rotating movement of the axles within the caps.

Within a more specific aspect of my invention, the caps are captured between the socket parts of the detent housing and base as above described. This combination of features thus achieves the two objects set forth above.

Having briefly described the essential features of my invention, the following drawings together with the more detailed description, will serve to explain the concepts and principles of the invention.

BRIEF DESCRIPTION OF THE DRAWINGS

FIG. 5 is an end-elevational view of one of the caps;

FIG. 6 is a cross-sectional view taken along the plane VI—VI of FIG. 5;

FIG. 7 is a cross-sectional view taken along the plane VII—VII of FIG. 5; and

FIG. 8 is a front-elevational view of the detent housing.

DESCRIPTION OF THE PREFERRED EMBODIMENTS

Figure 1:
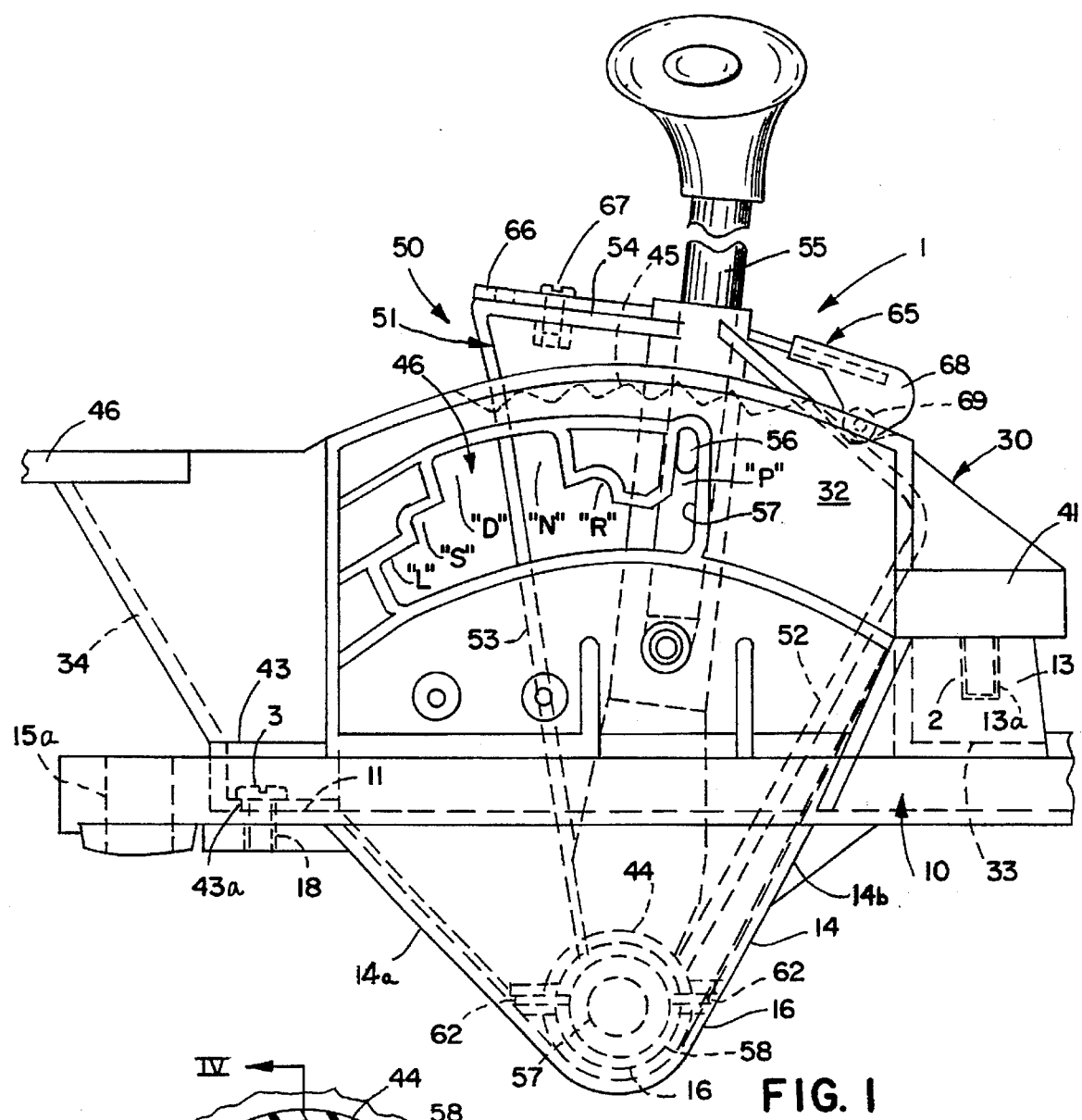
FIG. 1 a side-elevational view of the shifter mechanism of this invention.
Figure 3:
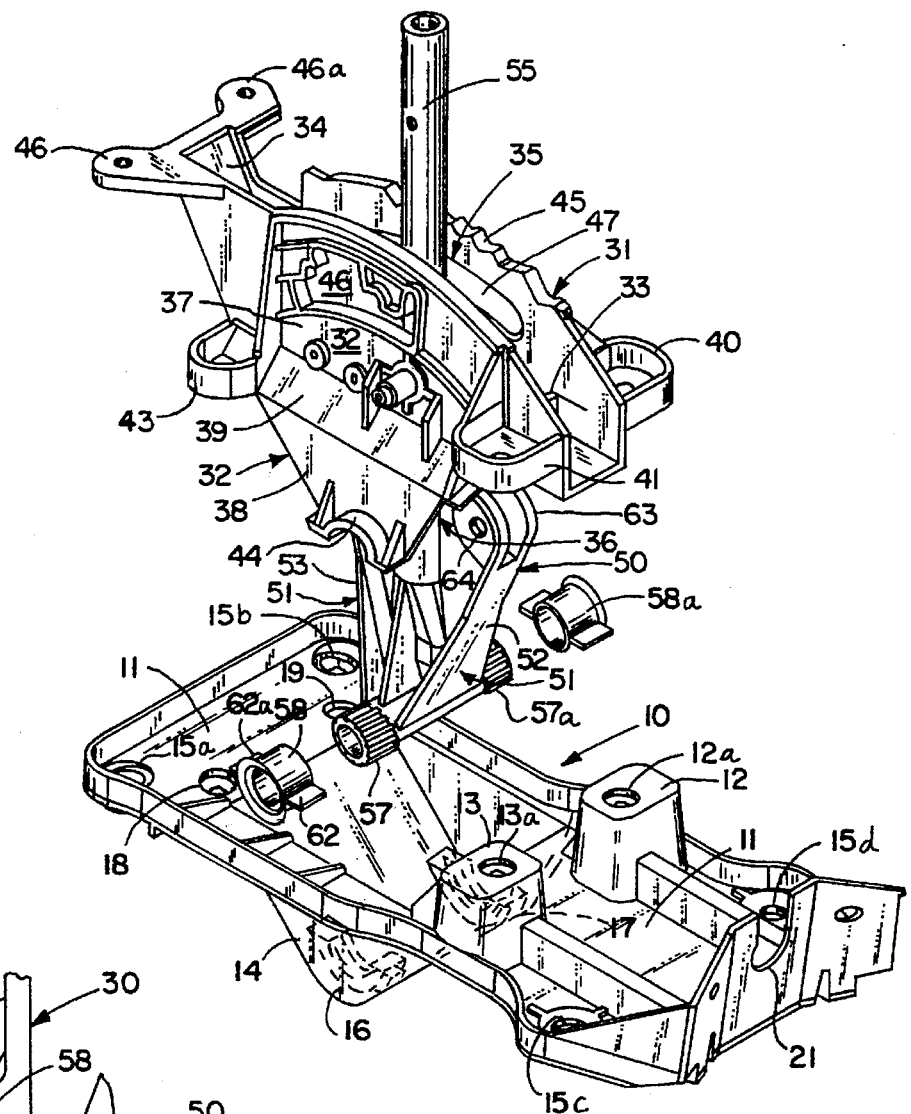
FIG. 3 is a side-elevational, perspective, exploded view of the various parts of the shifter mechanism of FIG. 1.

Referring to the drawings, reference numeral 1 designates the overall shifter mechanism of this invention which includes three major parts, namely the base 10, the detent housing 30, and the lever assembly 50 (FIGS. 1 and 3). These three major parts are connected together with the lever assembly 50 having its upper part extending through the detent housing and its lower part extending into the base 10 where it is pivotally mounted. These parts are attached together by the bolts 2 and 3 (FIG. 1) as will be described below or any other means such as a snap fit.

Figure 4:
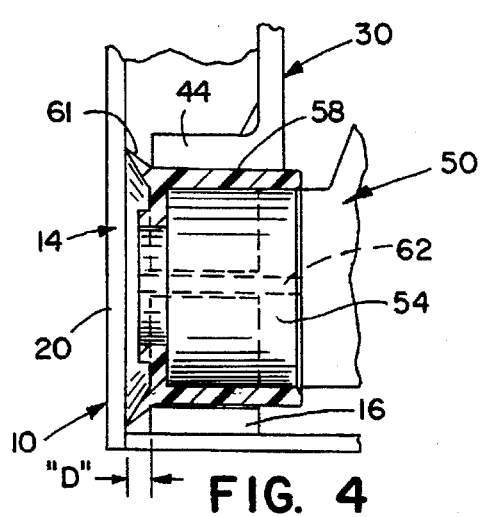
FIG. 4 is a cross-sectional view taken along the plane IV—IV of FIG. 2.

Base 10 is a molded, plastic part having the floor 11 from which the posts 12 and 13 extend upwardly and wall 14a and 14b extend downwardly forming the well of 14 well portion for receiving the lower end of the lever assembly 50. Posts 12 and 13 include tapped openings 12a and 13a, respectively, and base 10 includes tapped openings 18 and 19, such tapped openings being provided for securing detent housing 30 to base 10. A number of attachment openings 15a, 15b, 15c, and 15d are also provided to receive bolts (not shown) for securing the shifter to the floor pan of a vehicle. Cradles or sockets 16 and 17 are mounted adjacent the inner side walls of the well 14. The sockets are each spaced a distance "D" from the outer walls of the well 14, as disclosed in FIG. 4, showing socket 16 spaced from side wall 20, such spacing being for a specific purpose as will be described hereinafter. Base 10 also includes cable support opening 21. The base 10 is preferably molded from a plastic such as a filled nylon or filled polypropylene.

Detent housing 30 is preferably a one-piece, molded plastic housing also preferably molded from plastic such as a filled nylon or filled polypropylene. It includes the side walls 31 and 32 spaced a distance for closely receiving the lever assembly 50. The walls 31 and 32 are held in this position by the end walls 33 and 34, the end wall 33 being L-shaped and end wall 34 being inclined (see broken lines in FIG. 1). This construction of the detent housing therefore provides an upper opening 35 (FIG. 8) through which the lever assembly extends upwardly and a lower opening 36 (FIG. 8) through which the lever assembly 50 can be inserted during the assembly as will be described hereinafter. The upper edge of wall 31 has a plurality of undulations 45 forming what is commonly known as a "rooster comb." The "rooster comb" is a part of the feel mechanism, as will be described hereinafter. Walls 31 and 32 have upper wall portions 37 and 37a closely spaced parallel to each other and lower portions such as designated by reference numerals 38 and 38a, which are parallel to each other but spaced a greater distance than the upper portions. The upper portions are connected to the lower portions by slanted wall portions as designated in FIG. 8 by the reference numerals 39 and 39a. The edges of wall portions 38 and 38a are tapered downwardly toward each other, such taper corresponding to the taper of the well 14 of base 10 so as to fit within well 14.

Attachment flanges or ears 40, 41, 42, and 43 extend outwardly of the walls 31 and 32 for attaching detent housing 30 to base 10 by means of the bolts 2 and 3. As disclosed in FIG. 8, flanges or ears 40, 41 are located at a higher lever than flanges 42 and 43 to accommodate the different vertical levels of tapped openings 12a, 13a and 18, 19.

At the extreme lower end of the lower side wall portions 38 and 38a are located sockets 44 and 44a, respectively. These sockets provide a part of the novel pivoting means for the lever assembly 50 as will be described hereinafter.

The lever assembly 50 includes a one-piece, molded plastic body 51 of a somewhat triangular shape which in side-elevational view, includes front wall 52, rear wall 53 and top wall 54. The front and rear walls are inclined downwardly and at the very end thereof, axles 57 and 57a are formed. A hollow tube or handle 55 is inserted in the body 51. It includes a well-known mechanism (not shown) for actuating the pawl 56 which extends between walls 31 and 32 laterally of the fore and aft direction of the shifter and into the detent opening 47 in the wall 32 and into the opening 48 of wall 31. The pawl 56 is movable in the slot 63 of the tube 55 by a mechanism well known in the art to take the shifter out of the "Park" position in which it is shown for shifting to the other positions "R," "N," "D," "S," and "L" of the detent opening 47.

At the lower end of the lever assembly 50, the axles 57 and 57a, which are located on a common axis, receive the caps 58 and 58a. The axles 57 and 57a are rotatable in the caps 58 and 58a, respectively.

Figure 2:
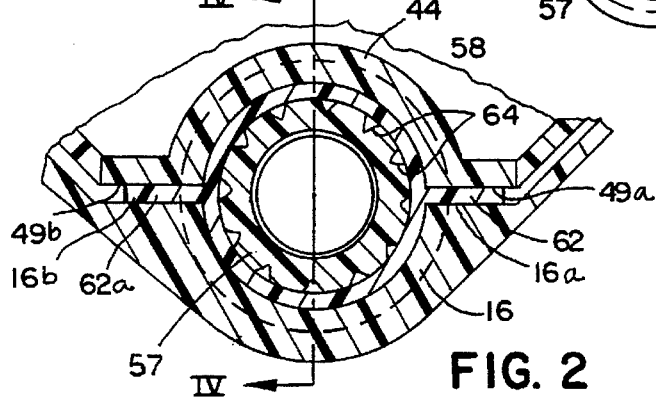
FIG. 2 is a cross-sectional view of the lower part of the shifter mechanism of FIG. 1, particularly illustrating the pivoting means for the lever assembly.

FIGS. 2 and 3 disclose the construction of the axles 57 and 57a. The axles are integrally molded with the body 50 and include a plurality of notches 64 provided for the dual purpose of reducing the surface area which contacts the inner surface area of the caps and providing spaces for lubricant such as a grease. The reduced surface area of the axles 57 and 57a along with the presence of the grease within the notches 64 reduces the force required to shift the lever assembly.

FIGS. 2, 4, 5, 6, and 7 disclose the construction of the caps 58 and 58a, it being understood that the caps are identical, and therefore, only the cap 58 will be described. Cap 58 is constructed of a plastic, lubricous material such as teflon-filled acetal. As disclosed in the cross sections of FIGS. 6 and 7, one end of the cap includes an opening 60 for receiving the axles 54 while the other end of the cap includes the flanges 61 specifically provided for a purpose to be described hereinafter. Flanges 62 and 62a extend outwardly from the walls of the cap 58 as best disclosed in FIGS. 5 and 7. The purpose of these flanges, as will be described hereinafter, is to prevent the walls of the caps from being squeezed by the inner surfaces of sockets 44 and 44a and sockets 16 and 17. Accordingly, the inner surfaces of the sockets are dimensioned to prevent such squeezing. Flanges 62 and 62a also prevent the cap from rotating when the lever assembly is pivoted from one gear position to the other. This is illustrated in FIGS. 2 and 4 and also will be described hereinafter. Other equivalent means, such as making the outer diameter of the caps 58 and 58a and the sockets 44 and 44a square, could possibly be used to prevent the caps from rotating with axles 57 and 57a. However, it is preferable that the flanges 62 and 62a be provided as explained above and hereinafter.

The caps 58 and 58a inserted on the axles 57 and 57a form trunnions on each side of the extreme lower ends of the body 51 of lever assembly 50 which, as will be described hereinafter, provides the pivoting means for the lever assembly on the base 10 and detent housing 30.

The lever assembly 50 also includes a cable or rod connector portion 63 which, as disclosed in FIG. 3, includes a recess in the forward portion of the body providing two spaced flanges, each of which having openings 64 through which a pin can be inserted for connecting either a cable or rod which is operatively connected to the transmission, to the lever assembly.

The lever assembly also includes a spring-biased feeling mechanism 65 attached to the top wall 54 of body 51. This feel mechanism includes a flat spring 66 attached to the top wall 54 by the screw 67. On the end of the flat spring is a body 68 on which is rotatably mounted roller 69 that rolls in the undulations 45 giving a feel to the driver as he or she shifts.

ASSEMBLY

Having described all the components of the present invention, the assembly of such components should be evident.

The components of the present shifter could be assembled in either one or two ways. In either way, after robbing some lubricant such as grease on the axles 57 and 57a, caps 58 and 58a are inserted on the axles with the flanges 62 and 62a preferably extending forwardly and rearwardly, respectively. Then, the lever assembly 50a is inserted upwardly through the bottom opening 36 of the detent housing 30 with the caps 58 and 58a engaging the surfaces of the sockets 57 and 57a, respectively. Next, the tapered lower ends 38 and 38a of the detent housing with the caps 58 and 58a in place are then inserted downwardly into the well 14 of base 10 by placing the caps 58 and 58a into the sockets or saddles 16 and 17 of base 10. The other way of assembly would be to insert the lower end of lever assembly 50 into the base by placing caps 58 and 58a into sockets 16 and 17 and then placing the detent housing over lever assembly 50. In either way, flanges 40 and 41 are then aligned with the posts 12 and 13, respectively, with openings 40a and 41a aligned with the openings 12a and 13a, respectively. At the same time, openings 42a and 43a of flange 42, 43 are aligned with openings 18 and 19. The bolts 2 and 3 are then screwed into the respective tapped openings 12a, 13a, 18, and 19, securing all of the parts together. This assembly of the parts is best shown in FIGS. 1, 2, and 4 wherein it will be seen that the lower tapered ends of the detent housing are snuggled within the inner walls of the tapered well 14. In this position, the caps 58 and 58a are captured between the socket or saddles 16 and 17 of the base 10 and the sockets 44 and 44a of the detent housing with the flanges 62 and 62a captured between the flat surfaces 49a and 49b and 16a and 16b of the sockets 16 and 44, respectively. Thus, the axles 57a and 57b are pivotable in and between the sockets 16, 17 and 44, 44a providing a pivoting means which permits forward and rearward pivoting of the lever assembly with minimum effort.

FIGS. 2 and 4 disclose the structure which assists in divorcing the side lateral movement of the lever assembly from the forward effort in pivoting the lever. As disclosed, the saddle or socket 16 is spaced the distance "D" from the side wall 20 of the well 14. Further, the saddle or socket 44 of the detent housing 30 is also spaced this distance "D," such spacing being provided for receiving the flange 61. Thus, cap 58 captured within this space is prevented from any lateral movement. While flange 61 is important in reducing lateral movement, within the preferred aspect of this invention it is critical that flanges 62 and 62a be trapped between the surfaces 16a and 16b of base 10 and surfaces 49a and 49b of detent housing 30 so as to hold the caps tight (no looseness) without squeezing diametrically on the outer surfaces of the caps 58 and 58a. This allows fine-tuning of the diameters of the axles 57 and 57a with respect to the inside diameters of the caps, which is the real key to divorcing looseness from pivoting effort. Also, lateral movement of the lever assembly is minimized by the axles extending to the end wall 59.

From the foregoing description, it may readily be observed by those skilled in the art that the present invention provides a shifter that is constructed of a minimum number of parts, is easily assembled, and divorces any lateral movement of the lever assembly from the forward and rearward efforts in pivoting the shifter to the various gear positions. Therefore, the structure of the invention is relatively low in cost since the parts readily lend themselves to being formed by molding. Further, the mechanism includes a minimum number of parts which are readily easy to assemble, therefore resulting in cost savings, not only because of the reduced cost of the parts themselves, but also in the labor costs.

Those skilled in the art will appreciate the many advantages of the present invention over the prior art and will also recognize that many modifications can be made without departing from the concept and spirit of the invention. It is therefore intended that the equivalent arrangements are to be included as part of this invention.

The embodiments of the invention in which an exclusive property or privilege is claimed are defined as follows:

1. A transmission shifter for a vehicle comprising:

a base having a pair of spaced first socket parts, each first socket part depressed downwardly for receiving a trunnion;

a detent housing having a pair of spaced second socket parts, each second socket part depressed upwardly for receiving a trunnion;

a lever assembly including a lever with a pair of spaced trunnions at the lower end of said lever, said trunnions being located on a common axis;

attachment for securing said base and detent housing together with said trunnions captured between said first and second socket parts whereby said lever is pivotable about said axis; and said trunnions including aligned axles and caps on said axles in which said axles rotate and further including means for preventing said caps from rotating with said axles, said caps including a cylindrical part for receiving one of said axles and flanges extending forwardly and rearwardly thereof, said flanges forming a part of said means and being captured between said base and detent housing.

2. The shifter of claim 1 in which first flat surface areas are located forwardly and rearwardly of said first socket parts, and second flat surface areas are located forwardly and rearwardly of said second sockets parts, said flanges being captured between said surface areas.

3. A transmission shifter for a vehicle comprising:

a base having a pair of spaced first socket parts, each first socket part depressed downwardly for receiving a trunnion;

a detent housing having a pair of spaced second socket parts, each second socket part depressed upwardly for receiving a trunnion;

a lever assembly including a lever with a pair of spaced trunnions at the lower end of said lever, said trunnions being located on a common axis;

attachments for securing said base and detent housing together with said trunnions captured between said first and second socket parts whereby said lever is pivotable about said axis; and said base includes downwardly extending walls forming a well portion in which said first socket parts are located.

4. The shifter of claim 3 in which said detent housing is a one-piece molded part having spaced upright walls with a lower opening between said walls at their lower ends, said walls each including one of said second socket parts at its lower end.

5. The shifter of claim 4 in which said well portion has front and rear walls tapered toward each other, and said walls of said detent housing each include wall portions having front and rear edges tapered toward each other so as to be received within said well portion, said second socket parts being located at the lower ends of said wall portions.

6. A transmission shifter for a vehicle comprising:

a base having a pair of spaced first socket parts, each first socket part depressed downwardly for receiving a trunnion;

a detent housing having a pair of spaced second socket parts, each second socket part depressed upwardly for receiving a trunnion;

a lever assembly including a lever with a pair of spaced trunnions at the lower end of said lever, said trunnions being located on a common axis;

attachments for securing said base and detent housing together with said trunnions captured between said first and second socket parts whereby said lever is pivotable about said axis; and said detent housing is a one-piece, molded part having spaced, upright walls with a lower opening between said walls at their lower ends, one of said walls having a detent opening.

7. The shifter of claim 6 in which said lever assembly includes a one-piece part having a first portion located between said walls and a second portion extending downwardly through said lower opening below said walls with axles extending from said second portion; said walls being spaced a distance less than the distance between the extreme ends of said axles whereby in assembling said lever assembly between said walls, said lever assembly can only be inserted through said lower opening.

8. A method of assembling a transmission shifter for a vehicle comprising:

providing a base having a pair of spaced first socket parts, each of said first socket parts being depressed downwardly for receiving a trunnion;

providing a detent housing having a pair of spaced second socket parts, each second socket part depressed upwardly for receiving a trunnion;

providing a lever assembly including a lever with a pair of spaced trunnions at the lower end of said lever, said trunnions being located on a common axis;

sandwiching said trunnions between said first and second socket parts;

securing said base and detent housing together with said trunnions captured between said first and second socket parts whereby said lever is pivotal about said axis; and such detent housing being a one-piece, molded part having spaced upright walls with a lower opening between said walls at their lower ends and said lever assembly includes a part having axles extending from the lower end thereof, said walls of said detent housing being spaced the distance less than the distance between the extreme ends of said axles including the step of passing the top end of said lever assembly through said lower opening between said walls.

* * * * *